United States Patent
Hess et al.

(10) Patent No.: US 9,617,978 B2
(45) Date of Patent: Apr. 11, 2017

(54) METHOD AND DEVICE FOR PREVENTING A LATERAL OSCILLATION OF A WIND POWER INSTALLATION

(75) Inventors: Felix Hess, Ludwigsburg (DE); Boris Buchtala, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 1080 days.

(21) Appl. No.: 13/703,020

(22) PCT Filed: May 20, 2011

(86) PCT No.: PCT/EP2011/002533
§ 371 (c)(1),
(2), (4) Date: Feb. 19, 2013

(87) PCT Pub. No.: WO2011/157342
PCT Pub. Date: Dec. 22, 2011

(65) Prior Publication Data
US 2013/0209254 A1    Aug. 15, 2013

(30) Foreign Application Priority Data
Jun. 15, 2010    (DE) .......................... 10 2010 023 887

(51) Int. Cl.
*F03D 7/04* (2006.01)
*F03D 7/02* (2006.01)

(52) U.S. Cl.
CPC ........... *F03D 7/042* (2013.01); *F03D 7/0224* (2013.01); *F03D 7/0296* (2013.01); *F03D 7/043* (2013.01);
(Continued)

(58) Field of Classification Search
CPC .... F03D 7/0224; F03D 7/0272; F03D 7/0276; F03D 7/0296; F03D 7/042;
(Continued)

(56) References Cited

U.S. PATENT DOCUMENTS 7,309,930 B2 * 12/2007 Suryanarayanan ... F03D 7/0272
290/44
7,317,260 B2 *  1/2008 Wilson ................. F03D 1/0608
290/44

(Continued)

FOREIGN PATENT DOCUMENTS

WO    02/075153 A1    9/2002
WO    2008/041066 A1    4/2008

OTHER PUBLICATIONS

International Search Report corresponding to PCT Application No. PCT/EP2011/002533, mailed Feb. 14, 2012 (German and English language document) (5 pages).

(Continued)

*Primary Examiner* — Craig Kim
*Assistant Examiner* — Julian Getachew
(74) *Attorney, Agent, or Firm* — Maginot, Moore & Beck LLP (57) ABSTRACT

A method for preventing a lateral oscillation of a tower of a wind power installation having at least two rotor blades with adjustable attitude angles includes determining a manipulated variable for setting the attitude angles on the basis of information about a pitch torque and a yaw torque of the head of the tower. In this context, a counteracting torque is generated which counteracts the pitch torque and the yaw torque without exciting a lateral oscillation of the tower if the attitude angles are set on the basis of the manipulated variable.

6 Claims, 2 Drawing Sheets

(52) U.S. Cl.
CPC ....... *F05B 2260/74* (2013.01); *F05B 2260/96* (2013.01); *F05B 2270/1095* (2013.01); *F05B 2270/331* (2013.01); *Y02E 10/723* (2013.01)

(58) Field of Classification Search
CPC ............ F05B 2260/96; F05B 2260/962; F05B 2260/966; F05B 2270/1095
See application file for complete search history.

(56) References Cited

U.S. PATENT DOCUMENTS

| | | | | |
|---|---|---|---|---|
| 2008/0247873 | A1* | 10/2008 | Egedal | F03D 1/008 416/43 |
| 2008/0265846 | A1* | 10/2008 | Laubrock | F03D 7/0272 322/29 |
| 2009/0317250 | A1* | 12/2009 | Gamble | F03D 1/0658 416/1 |

OTHER PUBLICATIONS

Thiringer et al., Periodic Pulsations from a Three-Bladed Wind Turbine, IEEE Transactions on Energy Conversion, Jun. 2001; pp. 128-133; vol. 16, No. 2.

* cited by examiner

METHOD AND DEVICE FOR PREVENTING A LATERAL OSCILLATION OF A WIND POWER INSTALLATION

This application is a 35 U.S.C. §371 National Stage Application of PCT/EP2011/002533, filed on May 20, 2011, which claims the benefit of priority to Serial No. DE 10 2010 023 887.2, filed on Jun. 15, 2010 in Germany, the disclosures of which are incorporated herein by reference in their entirety.

The present disclosure relates to a method and to an apparatus for preventing a transverse oscillation of a tower of a wind power plant.

BACKGROUND

In wind power plants with a horizontal axial and three rotor blades, the rotational speed above the rated wind speed is regulated by synchronous adjustment of the blade angles in such a way that changing the pitch angle causes the aerodynamic lift and therefore the driving torque to be changed in such a way that the plant is kept within the range of the rated rotational speed. At wind speeds above the switch-off speed, this blade adjustment mechanism is also used as a brake by virtue of the fact that the blades are positioned into the wind with the nose, with the result that the rotor no longer supplies any appreciable driving torque.

During this collective blade adjustment, pitching moments and yawing moments acting on the rotor are produced owing to asymmetric aerodynamic loads. The asymmetric loads arise, for example, as a result of wind shear in the vertical and horizontal directions, owing to boundary layers, as a result of the imprecise orientation of the wind power plant in the wind, gusts and turbulence or as a result of accumulation of the flow at the tower. In order to reduce these asymmetric aerodynamic loads, the pitch angle of the blades can be adjusted individually (Individual Pitch Control, IPC).

WO 2008/041066 A1 is concerned with controlling a rotor load of a wind turbine. In this context, the fore-aft oscillation, that is to say the oscillation in the direction of the wind, can be damped by collective pitching, during which process attempts are made to avoid generating any symmetrical blade oscillation.

DE 297 15 249 U1 describes a wind power plant having a rotor and at least one rotor blade which is mounted on the rotor so as to be rotatable about its longitudinal axis. In order to adjust a rotor blade angle, an adjustment device is provided which is configured to reduce a yawing moment and/or pitching moment which is applied to the rotor.

SUMMARY

The object of the present disclosure is to provide an improved method and an improved apparatus for preventing a transverse oscillation of a tower of a wind power plant.

This object is achieved by means of a method and an apparatus for preventing a transverse oscillation of a tower of a wind power plant as disclosed herein.

The present disclosure is based on the realization that the transverse oscillations of the tower of a wind power plant can be damped by using individual pitch angles of the rotor blades for that purpose. The object of an IPC controller according to the disclosure is therefore, by individually setting the pitch angles of the plates, not only to reduce the pitching moments and yawing moments but additionally also to damp the lateral tower oscillations.

A further realization of the present disclosure is that known IPC control can excite transverse oscillations of the tower. According to the disclosure this can be prevented by configuring the IPC controller in such a way that it does not excite the transverse oscillations.

The approach according to the disclosure can therefore be advantageously used in conjunction with a known IPC controller with which asymmetrical aerodynamic loads acting on the wind power plant can be reduced by individually adjusting the pitch angles of the blades. In this context, sensors are typically mounted in or on the rotor blades in order to measure the flexural bending torques on the rotor blades. These flexural bending torques then serve as controlled variables for the individual blade adjustment. The pitching moments and yawing moments can also be determined by measuring the gondola acceleration using gyrometers or by means of sensors which use distance measurements to measure the deformations of plant parts occurring as a result of the loads, and thereby determine the loads.

According to the disclosure, a reduction in the pitching moments and yawing moments is advantageously possible by means of IPC without the lateral tower oscillation being excited, and it is possible to damp the lateral oscillation by means of IPC without the pitching moment becoming unacceptably large.

The present disclosure provides a method for preventing a transverse oscillation of a tower of a wind power plant having at least two rotor blades with adjustable pitch angles, which method comprises the following step: determining one or more manipulated variables for setting the pitch angles on the basis of information about a pitching moment and a yawing moment of the rotor, wherein a counteracting torque is generated which counteracts the pitching moment and the yawing moment without exciting a transverse acceleration of the tower head when the pitch angles are set on the basis of the manipulated variable.

The method can be used, for example, in a wind power plant which has a tower at whose upper end a rotor is arranged. The rotor is mounted so as to be rotatable about a rotor axis which is substantially perpendicular with respect to the longitudinal axis of the tower. The transverse oscillation of the tower can occur in a direction which is oriented substantially perpendicularly with respect to the longitudinal axis of the tower and perpendicularly with respect to the rotor axis. The rotor can have three rotor blades. Each of the rotor blades can be mounted so as to be capable of rotating about its longitudinal axis on the hub individually and independently of the other rotor blades. Rotation about the longitudinal axis of a rotor blade is defined in each case by means of the pitch angle. The manipulated variable is suitable for defining an individual pitch angle for each of the rotor blades. On the basis of the manipulated variable, the pitch angles can be determined in accordance with a predetermined determination rule. Alternatively, the manipulated variable can already define the pitch angles. The manipulated variable can be designed to determine the pitch angles as a function of an angular position of the rotor by means of which a position of the rotor blades is defined. The manipulated variable can be determined by means of an IPC controller. The controller can be determined in accordance with a suitable controller design method in which the pitching moment, the yawing moment and the transverse acceleration are included. For this purpose it is possible to take into account the fact that a transverse acceleration of the tower is dependent on a portion of the manipulated variable which can influence the pitching moment. The aerodynamics of the wind power plant, which can be approximated, for example, by deriving a rotor blade torque according to the pitch angle of the rotor blade, can also be included in the controller design method. The pitching moment and the yawing moment can be based on current measured values or on a time profile of detected measured values. In this context, the pitching moment and the yawing moment can be measured directly or determined from measured values. Respectively suitable sensors can be used for the measurement. The pitching moment defines a pitching moment which acts on the rotor about a transverse axis which is substantially perpendicular with respect to the longitudinal axis of the tower and perpendicular with respect to the rotor axis. The yawing moment defines a torque which acts on the rotor substantially about the longitudinal axis of the tower. The transverse acceleration defines acceleration of the rotor or of the upper end of the tower in the direction of the transverse oscillation. When wind flows against the rotor blades during operation, they respectively develop a thrust force. The thrust force acts respectively on the rotor and the tower. By means of the pitch angles it is possible to influence the thrust forces. According to the disclosure, the manipulated variable can be determined from current values or time profiles of the pitching moment and of the yawing moment in such a way that the pitching moment and the yawing moment are reduced. In addition, the manipulated variable can be determined in such a way that the transverse oscillation is either not excited or else an existing transverse oscillation is damped.

According to one embodiment, during the determination of the manipulated variable the first natural frequency of the tower is suppressed with respect to the transverse oscillation in a time profile of the manipulated variable. For this purpose, the impulses which excite the first natural frequency, in particular in a portion of the manipulated variable which can influence the pitching moment, can be suppressed. The corresponding pulses can be suppressed using one or more filters. For example, a low-pass filter or a bandpass filter can be used. The low-pass filter can filter out frequency ranges in the region of the first natural frequency and above, and thereby suppress them. The bandpass filter can filter out frequency ranges in the region of the first natural frequency and thereby suppress them. In addition or as an alternative to a filter it is also possible to perform a limitation of the rate of change for the time profile of the manipulated variable. In this way excitation of the transverse oscillation can be suppressed.

The manipulated variable can also be determined on the basis of information about the transverse acceleration of the tower head in such a way that the resulting transverse force counteracts the transverse acceleration when the pitch angles are set on the basis of the manipulated variable. In this way, the transverse oscillation can be actively damped. The information about the transverse acceleration can be based on current measured values or on a time profile of detected measured values. In this context, the transverse acceleration can be measured directly or determined from measured values. Respectively suitable sensors can be used for the measurement. According to the disclosure, the manipulated variable can be determined from current values or time profiles of the pitching moment, of the yawing moment and of the transverse acceleration in such a way that the pitching moment and the yawing moment are reduced and the transverse oscillation is either not excited or is damped.

In this context, the transverse acceleration and the pitching moment are considered together. This makes it possible to avoid the situation in which the pitching moment is reduced at the cost of the transverse acceleration, or vice versa.

According to one embodiment, the manipulated variable can also be designed to set a generator torque of a generator of the wind power plant. In this context, a torque which counteracts the transverse acceleration can be generated when the generator torque is set on the basis of the manipulated variable. The generator can be coupled to the rotor and be arranged at the upper end of the tower. The generator can be connected to the rotor via a rotor shaft and/or a transmission. A rotational movement of the rotor can be converted into electrical energy by means of the generator. The influence of the generator torque can be used, for example, if the influence of the pitch angles is not sufficient to achieve the necessary damping effect.

The manipulated variable can be determined on the basis of information about a pitching moment which is weighted with a first weighting, a yawing moment which is weighted with a second weighting and a transverse acceleration which is weighted with a third weighting of the tower head. In this way, the variables whose damping has priority can be singled out.

For this purpose, in a setting step a ratio of the weightings with respect to one another can be set. As a result, an influence of the manipulated variable on the pitching moment and the yawing moment can be defined in relation to an influence of the manipulated variable on the transverse acceleration when the pitch angles are set on the basis of the manipulated variable. It is therefore possible to set whether the priority is to be on damping the transverse oscillation or reducing the torques. If the ratio of the weightings is shifted in such a way that the pitching moment is weighted more heavily and the transverse acceleration is weighted less, then suppression of the pitching moment is increased but the damping of the transverse oscillation is reduced. On the other hand, if the ratio of the weightings is shifted such that the transverse acceleration is weighted more heavily and the pitching moment is weighted less, the damping of the transverse oscillation is increased but the suppression of the pitching moment is reduced. The influence of the manipulated variable on the transverse acceleration is coupled to the influence of the manipulated variable on the pitching moment. The pitching moment and the yawing moment typically receive the same weighting. However, the pitching moment and the yawing moment can also be weighted differently.

According to one embodiment, the weightings are each made in the frequency range of the pitching moment, of the yawing moment and of the transverse acceleration. As a result, the weightings can be frequency-dependent. For example, low frequencies can be weighted more heavily than relatively high frequencies. The transverse acceleration can also be weighted more heavily in the region of the first natural frequency of the tower than in the adjacent frequency ranges.

The present disclosure also provides a method for preventing a transverse oscillation of a tower of a wind power plant having at least two rotor blades with adjustable pitch angles, which method comprises the following steps: determining a transverse force, acting on the tower, on the basis of deviations of individual pitch angles of the rotor blades with respect to a collective, mean pitch angle of all the rotor blades; and determining a setting value for setting a generator torque of a generator of the wind power plant on the basis of the transverse force and a transverse acceleration of the tower, wherein a torque which counteracts the transverse acceleration is generated when the generator torque is set on the basis of the setting value.

The deviations of the individual pitch angles can be determined by an IPC controller. The collective pitch angle is the same for all the rotor blades and can be selected such that the wind power plant is operated in the rated rotational speed range. The actual pitch angles are obtained from the collective pitch angle and the deviations. The deviations can be selected such that they reduce pitching moments and yawing moments caused by asymmetric aerodynamic loads. This approach makes it possible to damp tower oscillations in the transverse direction independently of the control used to suppress pitching moments and yawing moments by means of individual pitch angles.

The present disclosure also provides an apparatus for preventing a transverse oscillation of a tower of a wind power plant having at least two rotor blades with adjustable pitch angles, having the following features: a device for determining a manipulated variable for setting the pitch angles on the basis of information about a pitching moment and a yawing moment of the rotor, wherein a counteracting torque is generated which counteracts the pitching moment and the yawing moment without exciting a transverse oscillation of the tower when the pitch angles are set on the basis of the manipulated variable; and/or a device for determining a transverse force, acting on the tower, on the basis of deviations of individual pitch angles of the rotor blades with respect to a collective pitch angle of all the rotor blades and for determining a setting value for setting a generator torque of a generator of the wind power plant on the basis of the transverse force and a transverse acceleration of the tower, wherein a torque which counteracts the transverse acceleration is generated when the generator torque is set on the basis of the setting value.

An apparatus can be understood here to be an electrical apparatus which processes sensor signals and outputs control signals as a function thereof. The apparatus can have an interface which can be embodied by hardware and/or software. In a hardware embodiment, the interfaces may be, for example, part of what is referred to as an ASIC system which contains a wide variety of functions of the apparatus. However, it is also possible for the interfaces to be dedicated, integrated circuits and/or to be composed at least partially of discrete components. In a software embodiment, the interfaces can be software modules which are present, for example, on a microcontroller next to other software modules.

A computer program product having program code which can be stored on a machine-readable carrier such as a semiconductor memory, a hard disk memory or an optical memory and is used to carry out the method according to one of the embodiments described above when the program is run on an apparatus corresponding to a computer is also advantageous.

BRIEF DESCRIPTION OF THE DRAWINGS

The disclosure will be explained below by way of example with reference to the appended drawings, in which.

DETAILED DESCRIPTION

Identical or similar elements may be provided with identical or similar reference symbols in the following figures. In addition, the figures of the drawings, the description thereof as well as the claims contain numerous features in combination. To a person skilled in the art it is clear here that these features can also be considered individually or they can be combined to form further combinations which are not described here explicitly.

Figure 1:
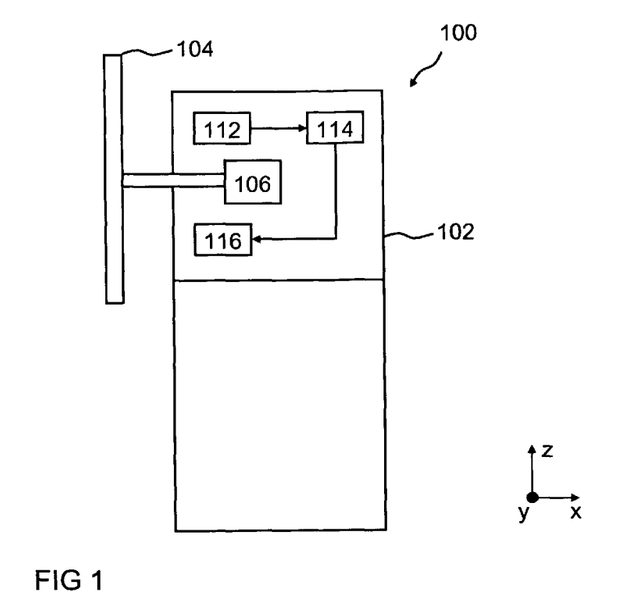
FIG. 1 shows a schematic illustration of a wind power plant according to an exemplary embodiment of the disclosure.

FIG. 1 shows a schematic illustration of a wind power plant according to one exemplary embodiment of the present disclosure. The wind power plant has a tower 100 which has a tower head 102 in an end region. The tower head 102 can be embodied as a gondola and is mounted so as to be rotatable about a longitudinal axis of the tower 100. The longitudinal axis can run in the vertical direction, in the direction of a z axis. A rotor 104 of the wind power plant is arranged on the tower head 102. According to this exemplary embodiment, the rotor 104 has three rotor blades. The rotor 104 is mounted so as to be rotatable about a rotor axis. The rotor axis can run in the horizontal direction, in the direction of an x axis. The rotor axis can be oriented perpendicularly or essentially perpendicularly with respect to the longitudinal axis of the tower. The rotor 104 is coupled, for example, to a generator 106 via a rotor shaft and/or a transmission. A rotational movement of the rotor 104 can be converted into electrical energy by the generator 106. The generator 106 is arranged in the tower head 102.

Forces and torques are applied to the rotor 104 by a wind acting on the rotor 104. These forces and torques may bring about, for example, a pitching moment about a transverse axis of the tower 100, a yawing moment about the longitudinal axis of the tower and accelerations of the tower head 102 in horizontal directions. The transverse axis of the tower 100 can run in the y direction, perpendicularly or essentially perpendicularly with respect to the longitudinal axis of the tower 100 and the rotor axis. The transverse axis can run through the tower head 102. The accelerations can act both in the x direction, that is to say parallel to the direction of the wind, as well as in the y direction, that is to say transversely with respect to the direction of the wind. The acceleration in the y direction is referred to below as transverse acceleration and causes a transverse oscillation of the tower 100.

The forces and accelerations acting on the tower 100 can be measured by means of suitable measuring devices 112. For this purpose, acceleration sensors and strain gauges which are arranged, for example, on the tower head 102 or on the rotor 104 can be used. According to this exemplary embodiment, the pitching moment, the yawing moment and the transverse acceleration can either be measured directly by means of the measuring devices 112, or basic values can be measured from which the pitching moment, the yawing moment and the transverse acceleration can be determined. The measuring devices 112 are designed to output information about the pitching moment, the yawing moment and the transverse acceleration to a determining device 114.

The determining device 114 is designed to determine, on the basis of the pitching moment, the yawing moment and the transverse acceleration, at least one manipulated variable for setting individual pitch angles of the rotor blades of the rotor 104. In addition, the determining device 114 can be designed to determine values for the individual pitch angles from the at least one manipulated variable and to output said values to a control device 116. Suitable transformations can be used to determine the pitch angles on the basis of the at least one manipulated variable. The control device 116 is designed to set the rotor blades to the pitch angles defined by the at least one manipulated variable, on the basis of the at least one manipulated variable or the values for the individual pitch angles.

According to one exemplary embodiment, the measuring devices 112 can additionally be designed to detect a bending torque of the rotor blades, and the determining device 114 can be designed to determine the manipulated variable also on the basis of the bending torques or a transverse force acting therefrom on the tower head 102.

According to a further exemplary embodiment, the determining device 114 can be designed to determine a setting value for a generator torque of the generator 106 as a further manipulated variable. In this context, the determining device 114 can be designed to determine the setting value for the generator torque and the values for the individual pitch angles together, with the result that said values can already be matched to one another during the determining process. Alternatively, the setting value for the generator torque and the values for the individual pitch angles can be determined one after another. In this context, the values for the individual pitch angles are firstly determined. From the values for the individual pitch angles it is then possible to determine which transverse force is acting on the tower head 102. The setting value for the generator torque can be set in such a way that the generator torque counteracts the transverse force caused by the pitch angles.

Possible embodiments of the determining device 114 are described in more detail with reference to FIG. 3.

Figure 2:
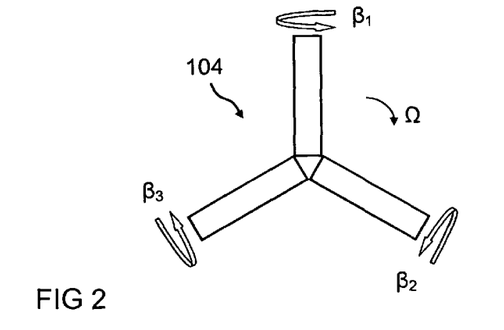
FIG. 2 shows a schematic illustration of a rotor, according to an exemplary embodiment of the disclosure.

FIG. 2 shows a schematic illustration of a rotor 104 of a wind power plant, according to an exemplary embodiment of the present disclosure. The rotor 104 has three rotor blades which are spaced apart at equal angular intervals. The rotor 104 can carry out a rotational movement about its rotor axis. A rotational angle of the rotational movement is characterized by $\Omega$. The three rotor blades can each be rotated about their longitudinal axis which is oriented substantially perpendicularly with respect to the rotor axis. Corresponding pitch angles are characterized by $\beta_1$, $\beta_2$, $\beta_3$.

Figure 3:
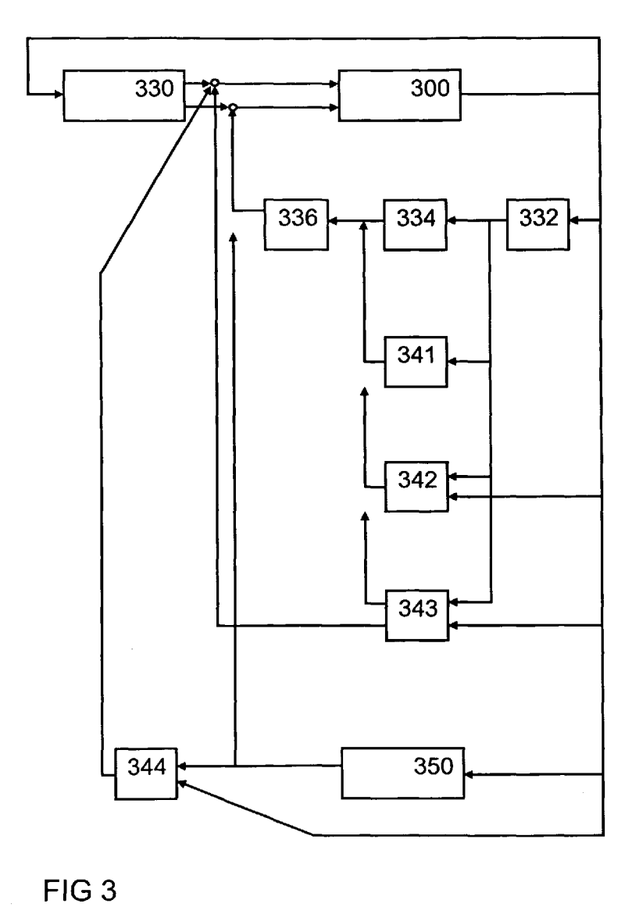
FIG. 3 shows a block diagram of a controller according to an exemplary embodiment of the disclosure.

FIG. 3 shows a block diagram of a controller, according to an exemplary embodiment of the disclosure. A wind power plant 300, which can be embodied in the form of the wind power plant shown in FIG. 1, is shown. An operational controller 330 is designed to receive measured values from the wind power plant 300 and determine setting values therefrom for the wind power plant 300. The operational controller 330 is designed to determine a value for the generator torque $M_{Gen}$ and values for the pitch angles $\beta_{1,2,3}$ of the rotor blades and output them.

The pitch angles of the rotor blades can be set individually by means of a standard IPC controller 332, 334, 336. The transformation device 332 is designed to determine, on the basis of the flexural bending torques measured at the wind power plant 300, at the rotor blades, a pitching moment $M_D$ acting on the wind power plant 300 and a yawing moment $M_Q$. For this purpose, the transformation device 332 is designed to carry out an inverse transformation, for example a $DQ^{-1}$ transformation (inverse direct-quadrature transformation) in which a transformation between a three-phase rotating coordinate plant and a stationary coordinate plant is carried out. The controller 334 can be designed to determine manipulated variables $\beta_D$, $\beta_Q$ on the basis of the pitching moment $M_D$ and the yawing moment $M_Q$. The transformation device 336 is designed to determine individual deviations $\Delta\beta_{1,2,3}$ of the pitch angles of the rotor blades on the basis of the manipulated variables $\beta_D$, $\beta_Q$. For this purpose, the transformation device 336 can be designed to carry out a transformation, for example a DQ transformation (direct-quadrature transformation) in which a transformation between a stationary coordinate system and a three-phase rotating coordinate system is carried out.

The deviations $\Delta\beta_{1,2,3}$ are combined with the pitch angles $\beta_{1,2,3}$ output by the operational controller, with the result that the pitch angles $\beta_{1,2,3}$ which are combined with the deviations $\Delta\beta_{1,2,3}$ are fed to the wind power plant 300.

An embodiment of the IPC controller 332, 334, 336 is described in detail below.

The IPC control is a possible method for reducing the loads of the wind power plant on the basis of what is referred to as the DQ or Coleman transformation. In this context, the pitch angle $\beta_i$ is calculated for each individual rotor blade from $$\beta_i = \beta_{CPC} + \beta_1^D \cos(\Omega_i) + \beta_1^Q \sin(\Omega_i) + \beta_2^D \cos(2\Omega_i) + \beta_2^Q \sin(2\Omega_i) + \ldots$$

Here, $\beta_{CPC}$ is the collective pitch angle predefined by the operational controller and $\Omega_i$, with i=1, 2, 3, is the rotational position of the respective rotor blade, wherein the angle is 0 degree when the rotor blade points vertically upward. The manipulated variables $\beta_1^D$ and $\beta_1^Q$ are calculated by the IPC controller in order to adjust the yawing moments and pitching moments of the rotor to zero. If only $\beta_1^D$ and $\beta_1^Q$ are used for the individual pitch control, 1p-IPC is referred to. All the $\beta_2^D$, $\beta_1^Q$ and higher are 0 here. In the text which follows, only 1p-IPC is considered. Here, the $\beta_1^D$ and $\beta_1^Q$ are calculated by an IPC controller with the objective of adjusting the pitching moments and yawing moments to zero. The procedure is as follows here: the flexural bending torques $M_i$ at the three rotor blades are measured. The pitching moments and yawing moments are calculated therefrom by means of the inverse Coleman transformation:

$$\overline{M}_1^D = \sum_{i=1}^{3} M_i \cos\Omega_i$$

$$\overline{M}_1^Q = \sum_{i=1}^{3} M_i \sin\Omega_i$$

Subsequently, these signals can be filtered by means of a filter F since they have interference components superimposed on them. Alternatively, the pitching moments and yawing moments $\overline{M}_1^D$, $\overline{M}_1^Q$ can also be measured or calculated by means of other methods.

$$M_1^D = F \cdot \overline{M}_1^D$$

$$M_1^Q = F \cdot \overline{M}_1^Q$$

A correspondingly configured controller K can then calculate the setting signals from these measurement signals.

$$\begin{pmatrix} \beta_1^D \\ \beta_1^Q \end{pmatrix} = K \cdot \begin{pmatrix} M_1^D \\ M_1^Q \end{pmatrix}$$

In order to damp the tower oscillation, the oscillations of the tower can be damped in the direction of the wind by the pitch angle $\beta_{CPC}$. For this purpose, a controller measures the tower head acceleration in the fore-aft direction, that is to say in the direction of the wind, and the pitch angle $\beta_{CPC}$ is calculated in such a way that the thrust force acting on the rotor is correspondingly increased or decreased in order to damp the oscillation with the resulting thrust forces.

The generator torque can be used for damping for the oscillations of the tower transversely with respect to the direction of the wind. If the torque is increased, the tower is deflected more strongly to the side. Given a reduction in the generator torque, the deflection decreases correspondingly. This behavior can then be used to damp the oscillations transversely with respect to the direction of the wind by virtue of the fact that a controller measures the corresponding tower head acceleration and modifies the generator torque in such a way that the transverse oscillation is damped. This method has the disadvantage that as a result the power which is output by the plant to the power network is influenced.

According to the disclosure, the transverse oscillations of the tower of a wind power plant can be damped by using individual pitch angles for that purpose. The objective of the IPC controller is therefore no longer only to reduce the pitching moments and yawing moments but instead additionally to damp the lateral tower oscillations. Furthermore, the IPC control known according to the prior art can excite transverse oscillations of the tower. This is prevented by the disclosure since the IPC controller can therefore be configured in such a way that it does not excite the transverse oscillations.

The approach according to the disclosure is based on the knowledge of the linearized differential equation of the tower transverse oscillation.

$$\ddot{y} = -\frac{C}{m}y - \frac{D}{m}\dot{y} - \frac{A}{m}\beta_1^D - k\frac{i_{GB}}{m}M_{gen}$$

Here, y is the deflection of the tower in the transverse direction, C is the spring constant and D is the damping constant of the tower. These can be calculated from the configuration data of the tower. m is the tower head mass which is known. The constant k describes the coupling between an acting torque on the tower head and the resulting deflection of the tower head. It can be calculated from the configuration data of the tower. As an approximation it is also possible to use the constant $$k = \frac{3}{2 \text{ tower height}}$$

which is applicable for a linear bending bar. $i_{GB}$ is the transmission ratio, $M_{gen}$ is the generator torque. The constant A can be calculated from the aerodynamics of the wind power plant. For this purpose, the characteristic diagram $c_M$ ($\lambda$, $\beta$) of the wind power plant is used. The rotor torque can be calculated using the characteristic diagram. The approximation for the constant A follows from said rotor torque. The following applies here:

$$A = \frac{3}{R}\frac{\partial M}{\partial \beta}$$

with the rotor radius R and the partial derivation of the rotor torque according to the pitch angle $$\frac{\partial M}{\partial \beta}$$

at the instantaneous working point.

As a result, the transverse oscillation is excited by the term $$\frac{A}{m}\beta_1^D.$$

The tower transverse oscillation is only excited by $\beta_1^D$. This portion of the pitch angle leads to the pitch angle of the rotor blade being increased if it points upward and reduced if it points downward. In this context, the torque which acts on the rotor shaft remains constant. However, as a result forces acting in the lateral direction are produced and the pitching moment of the plant is influenced. The IPC controller can then therefore use the manipulated variable $\beta_1^D$ to damp the transverse oscillations and adjust the pitching moment to zero.

Excitation as a result of $\beta_2^D$ does not occur, and for this reason only 1p-IPC has to be considered here. IPC with an even higher order can lead again to excitations of the transverse oscillation, but in reality is not used since the blades would have to be rotated too quickly for this.

This approach can be implemented in the devices 341, 342, 343, 344 shown in FIG. 3. In this context, the devices 341, 342, 343, 344 are alternatives which are mutually exclusive. Just one of the variants 341, 342, 343, 344 can be used at any time.

For the different variants 341, 342, 343, 344 of the possibilities for suppressing the excitation of the tower transverse oscillations the following respectively applies:

$$\Delta\beta_i = \beta_1^D \cos(\Omega_i) + \beta_1^Q \sin(\Omega_i) + \beta_2^D \cos(2\Omega_i) + \beta_2^Q \sin(2\Omega_i) + \ldots$$

This equation describes the DQ transformation 336.

The device 341 is arranged instead of the controller 334. The device 341 is designed either to determine or to influence the manipulated variables $\beta_D$, $\beta_Q$ on the basis of the pitching moment $M_D$ and the yawing moment $M_Q$. If the device 341 is used instead of the controller 334, the differential equation of the tower transverse oscillation is also taken into account in the configuration of the IPC controller, and the controller is configured in such a way that excitation of the transverse oscillation as far as possible does not occur. This is possible by virtue of the fact that during the configuration it is required that the controller suppresses the first tower natural frequency in $\beta_1^D$.

As a result, no active damping of the transverse oscillation takes place, but instead only the excitation of this oscillation is suppressed by the IPC controller.

Device 342 is arranged instead of the controller 334. The device 342 is designed either to determine or to influence the manipulated variables $\beta_D$, $\beta_Q$ on the basis of the pitching moment $M_D$ and the yawing moment $M_Q$ as well as the transverse acceleration $a_{transv}$ measured at the wind power plant 300. If the device 341 is used instead of the controller 334, the controller receives the measured tower head transverse acceleration as an additional measuring signal. As a result, the oscillation can be actively damped. The performance can then be significantly improved.

The bending torque of the rotor blades in the plane of the rotor can be used as a further measuring signal. The transverse force can be calculated approximately from the bending torques.

The device 343 is arranged instead of the controller 334. The device 343 is designed either to determine or to influence the manipulated variables $\beta_D$, $\beta_Q$ on the basis of the pitching moment $M_D$ and the yawing moment $M_Q$ as well as the transverse acceleration $a_{transv}$ measured at the wind power plant 300. In addition, the device 343 is designed to determine a deviation of the generator torque $\Delta M_{Gen}$. The deviation $\Delta M_{Gen}$ is combined with the generator torque $M_{Gen}$ which is output by the operational controller, with the result that the generator torque which is combined with the deviation $\Delta M_{Gen}$ is fed to the wind power plant 300. If the device 341 is used instead of the controller 334, the controller receives the generator torque as a further manipulated variable. As a result, it is possible to influence the tower transverse oscillation not only by means of $\beta_1^D$ but also by means of the generator torque. The disadvantage of this variant is that the generator torque influences the power output by the plant.

The device 344 can be used in conjunction with an IPC controller 350 of any design. The controller 350 has here the objective of suppressing pitching moments and yawing moments. The controller can receive measurement variables of the wind power plant 300, for example the bending torques of the rotor blades, and determine deviations $\Delta \beta_i$ of the pitch angles on the basis thereof. The deviations $\Delta \beta_i$ are combined with the pitch angles $\beta_{1,2,3}$ output by the operational controller, with the result that the pitch angle combined with the deviations $\Delta \beta_i$ are fed to the wind power plant 300. The device 344 is designed to receive the deviations $\Delta \beta_i$ and the measured transverse acceleration of the tower and to determine a deviation of the generator torque $\Delta M_{Gen}$ on the basis thereof. Deviation $\Delta M_{Gen}$ is combined with the generator torque $M_{Gen}$ which is output by the operational controller, with the result that the generator torque which is combined with the deviation $\Delta M_{Gen}$ is fed to the wind power plant 300.

By means of the device 344, damping of the tower transverse oscillations is independent of the implementation of IPC control by the DQ transformation. As a result, this approach can be implemented for any possible individual pitch controller. It is assumed that any desired IPC controller uses as output variables deviations $\Delta \beta_i$ of the pitch angles of the individual blades from the collective pitch angle $\beta_{CPC}$ as manipulated variables.

$$\Delta \beta_i = \beta_i - \beta_{CPC}$$

The resulting transverse force acting on the tower by means of the different pitch angles can then be calculated as $$F_y = A \sum_{i=1}^{3} \Delta \beta_i \cos \Omega_i$$

In addition, the tower head transverse acceleration is additionally available again as a measurement variable. A controller 344 can then be designed which suppresses excitation of the transverse oscillation by $F_y$ by means of an intervention into the generator torque. An intervention by means of the individual pitch angles is not possible in this way since otherwise the existing IPC controller 350 could be unfavorably influenced.

The approaches according to the disclosure make it possible to damp the oscillation transversely with respect to the direction of the wind. The pitching moments which act on the tower head from the rotor are coupled with the lateral force which the rotor applies to the tower head. The yawing moment is independent thereof. According to the disclosure, IPC is used in order to reduce both the pitching moments and the yawing moments as well as to avoid exciting the lateral tower oscillation, such as is possible, for example, by means of the device 334, or even to damp them, such as is possible by means of the device 341. For this purpose, the lateral tower head acceleration is measured, as are the pitching moments and yawing moments, for example by means of strain gauges, together with the deflection of the rotor blades in the impacting direction or the bending of the rotor shaft.

As a result a combination of the reduction of the yawing moments and pitching moments occurs in combination with the damping of the lateral tower oscillation. Both aspects are considered by a controller, with the result that in the event of contradictory requirements the controller can weigh up the situation in order to achieve the best reduction.

In the text which follows, an exemplary embodiment is used to describe how the controller can be optimized for this purpose.

The flexural bending torques of the three rotor blades or equivalent variables such as the deflection in the impacting direction and the lateral tower head acceleration are measured on the plant and fed to a controller. The latter outputs as manipulated variables three individual pitch angles for the three rotor blades. In the controller, the pitching moment $M_D$ and the yawing moment $M_Q$ are calculated from the three flexural bending torques by means of the DQ transformation and filtering. The set moments are then fed, together with the lateral tower head acceleration, to the actual core controller K. The latter calculates the manipulated variables $\beta_D$, $\beta_Q$, which are then converted into three individual pitch angles by means of the inverse DQ transformation, and output to the plant.

In the text which follows, an exemplary embodiment is used to describe how the core controller K is designed. Here, the DQ transformation and the signal filtering are not included.

According to this exemplary embodiment, the H-infinity controller design method is used for the controller design. The controller design method searches a controller K for a system P in such a way that the "worst" possible interference at the interference input w is transmitted to the performance output z after having been amplified as little as possible or attenuated as much as possible. The quotient of signal energy(z)/signal energy(w) for the "worst" w is therefore minimized. This quotient is precisely the H-infinity standard of the closed control circuit, composed of the system P and the controller K.

With respect to a wind power plant, a system description of the wind power plant is firstly produced in the form of a differential equation system. The interference input w contains a description of the asymmetry of the wind field which impinges on the plant. Said interference input w is composed of two components vc and vs which describe the vertical and the horizontal oblique flow. The vector composed of the pitching moment $M_D$, the yawing moment $M_Q$ and the lateral tower head acceleration is used as the performance output z. Precisely the same vector is also used as a measuring output y.

The performance output is also weighted with a weighting function W. As a result, certain regions in the frequency range can be weighted more heavily, with the result that it is, for example, appropriate to select a relatively high weight in the region of the first natural frequency of the tower for the lateral tower head acceleration so that the latter is particularly well suppressed by the controller. The controller has the pitch angles $\beta_D$, $\beta_Q$ available as manipulated variables.

The design method finds a controller such that in the performance output the interference w resulting from the various oblique flows can as much as possible no longer be seen. In this context, the interference is suppressed simultaneously in all three components of the performance vector.

As a result of a change in the weighting function, the three components can then be weighed against one another. A high weight can be selected for the pitching moment $M_D$ and the yawing moment $M_Q$ can be selected for low frequencies. This permits stationary suppression of the interference. A low weight can be selected for the pitching moment $M_D$ and the yawing moment $M_Q$ and the tower head acceleration for high frequencies. This makes it possible to prevent the manipulated variables from containing high-frequency components which the actuators cannot follow. A high weight can be selected for the lateral tower head acceleration for low frequencies with a maximum (peak) at the first tower natural frequency. As a result, the first tower natural frequency can be suppressed particularly strongly.

It is then still possible to weigh up the pitching moment $M_D$ and the yawing moment $M_Q$ and the lateral tower head acceleration against one another by virtue of the fact that the individual weighting functions overall are shifted upward or downward. If the weighting of the tower head acceleration is increased, the tower head acceleration is damped more greatly than the moments $M_D$, $M_Q$ are reduced. Conversely, the moments $M_D$, $M_Q$ are reduced to a greater extent if the moments $M_D$, $M_Q$ are weighted more strongly.

After this configuration has been implemented, the controller K is defined. No further adaptation of the controller is therefore performed during operation. The controller automatically selects the optimum intervention within the sense of the formulated requests.

In the time domain there is no cost function in the classic sense. Instead, the cost function is formulated in the frequency domain by means of the selection of the weighting function for the performance output.

The exemplary embodiments shown are selected only by way of example. The exemplary embodiments described permit the tower oscillation excitation to be prevented at the IPC. For the purpose of the inventive combination of the IPC control with a measurement of the transverse acceleration of the tower head it is possible to use an existing or an additional sensor system. An intervention of the IPC controller in the torque control of the generator can lead to power fluctuations. The tower transverse dynamics can also be taken into account only in the configuration of the IPC controller without using additional measuring signals. The approach according to the disclosure can be used for IPC control of wind power plants. Such control can also serve as an add-on for existing plant control systems. Here, the IPC control is not intended to excite any tower transverse oscillations. In addition, the transverse oscillation can be actively damped.

LIST OF REFERENCE NUMERALS

100 Tower
102 Tower head
104 Rotor
106 Generator
112 Measuring device
114 Determining device
116 Control device
300 Wind power plant
330 Operational controller
332 Transformation device
334 Controller
336 Transformation device
341 Controller
342 Controller
343 Controller
344 Controller
350 Controller

The invention claimed is:

1. A method for preventing a transverse oscillation of a tower of a wind power plant including a rotor having at least two rotor blades with adjustable pitch angles, comprising:
    receiving sensor signals from sensors associated with the rotor, the sensor signals being indicative of a pitching moment and a yawing moment acting on the rotor;
    determining a manipulated variable for setting the pitch angles as a function of (i) the pitching moment and (ii) the yawing moment acting on the rotor indicated by the sensor signals, the manipulated variable indicating pitch angles for the rotor blades at which a counteracting torque is generated for counteracting the pitching moment and the yawing moment without exciting a transverse oscillation of the tower when the pitch angles are set; and
    setting the pitch angles of the rotor blades to the pitch angles indicated by the manipulated variable, wherein the determination of the manipulated variable comprises:
    determining a performance output of the wind power plant, the performance output being a vector comprising the pitching moment, the yawing moment, and the transverse acceleration;
    weighting the performance output using a weighting function in which (i) the pitching moment is weighted with a first weighting using a weighting function W, (ii) the yawing moment is weighted with a second weighting using the weighting function W, and (iii) the transverse acceleration which is weighted with a third weighting using the weighting function W of the tower; and
    determining the manipulated variable as a function of the weighted performance output.

2. The method as claimed in claim 1, wherein the determination of the manipulated variable further comprises:
    suppressing frequency ranges in a region of a the first natural frequency of the tower.

3. The method as claimed in claim 1, further comprising:
    determining the manipulated variable as a function of the pitching moment, the yawing moment, and a transverse acceleration of a tower head of the tower in such a way that a resulting transverse force counteracts the transverse acceleration when the pitch angles are set to the pitch angles indicated by the manipulated variable.

4. The method as claimed in claim 1, further comprising:
    determining a further manipulated variable as a function of the pitching moment and the yawing moment indicated by the sensor signals, the further manipulated variable indicating a generator torque setting for a generator of the wind power plant at which a generator torque is generated which counteracts the transverse acceleration.

5. The method as claimed in claim 1, further comprising:
   setting a ratio of the first, the second, and the third weightings with respect to one another in order to adjust the pitching moment and the yawing moment in relation to the transverse acceleration when the pitch angles are set using the manipulated variable.

6. The method as claimed in claim 1, wherein the first, the second, and the third weightings are each made in the a frequency range of the pitching moment, of the yawing moment and of the transverse acceleration.

* * * * *